United States Patent [19]

Standley et al.

[11] 4,184,362
[45] Jan. 22, 1980

[54] BOTTLE LEAK TESTER

[75] Inventors: Wendell E. Standley, Lake Forest; Edward M. Naureckas, Libertyville Township, Lake County, both of Ill.

[73] Assignee: Abbott Laboratories, North Chicago, Ill.

[21] Appl. No.: 927,432

[22] Filed: Jul. 24, 1978

[51] Int. Cl.² .............................................. G01M 3/20
[52] U.S. Cl. ...................................... 73/40.7; 73/45.1
[58] Field of Search ............... 73/40.7, 49.2, 52, 41, 73/45, 45.1, 45.2

[56] References Cited

U.S. PATENT DOCUMENTS

| | | | |
|---|---|---|---|
| 2,486,199 | 10/1949 | Nier | 73/40.7 |
| 3,247,373 | 4/1966 | Herzog et al. | |
| 3,265,890 | 8/1966 | Briggs | |
| 3,277,295 | 10/1966 | Briggs | |
| 3,342,990 | 9/1967 | Barrington et al. | |
| 3,520,176 | 7/1970 | Becker | 73/40.7 |
| 3,690,151 | 9/1972 | Briggs | 73/40.7 |
| 3,729,983 | 5/1973 | Coppens | 73/40.7 |
| 3,729,984 | 5/1973 | Waldherr | 73/52 |
| 3,762,212 | 10/1973 | Morley et al. | 73/40.7 |
| 3,914,983 | 10/1975 | Umezu | 73/40.7 |
| 3,949,596 | 4/1976 | Hawk | 73/40.7 |

Primary Examiner—Anthony V. Ciarlante
Assistant Examiner—Joseph W. Roskos
Attorney, Agent, or Firm—Robert L. Niblack; Neil E. Hamilton

[57] ABSTRACT

An apparatus and method for detecting leaks at a fast rate in plastic bottles or similar containers wherein the bottles are secured in a multiplicity of open pocket members and arranged in a plurality of rows on a rotatable turret. A detecting gas is introduced into the bottles and they are subsequently moved to a detecting station where a detection means in the form of a mass spectrometer is activated by any gas leaking from the bottles. In a preferred manner, air is utilized to effect a sweeping action over the bottle exterior to move the detecting gas in the direction of the mass spectrometer. Air is also utilized to purge detecting gas from the pockets and air with vacuum to purge the bottles so that a rapid detecting system can be effected. The preferred gas used as the detecting media is helium and the bottles described are of the semirigid, plastic type which are used to contain sterile liquids. Such bottles can have holes small enough so the liquid will not leak out, but large enough to admit bacteria or other contaminates which would thus make the solutions nonsterile. In order to reach high capacity rates, the rotating turret constitutes a multiplicity of wheels having a multiplicity of pockets each which index through a sequence of different positions. Preferably, the rotating turret is composed of six wheels having twelve pockets each which index through twelve different positions.

29 Claims, 8 Drawing Figures

BOTTLE LEAK TESTER

BACKGROUND OF THE INVENTION

This invention relates to an apparatus and method for detecting leaks in containers. More particularly, it relates to an apparatus and method for detecting leaks in semirigid, plastic containers which method and apparatus is highly sensitive for detecting leaks yet is adaptable for various production rates.

Leak detection utilizing helium gas and mass spectrometers is well known and is described in the following U.S. Pat. Nos.: 2,486,199; 3,342,990; 3,247,373; 3,265,890; 3,277,295 and 3,690,151. The use of helium to detect leaks in particular vessels is also described in U.S. Pat. No. 3,949,596 and 3,520,176. Helium for use in a leak testing machine of the type concerned with in this invention is described in U.S. Pat. No. 3,914,983 whereas U.S. Pat. No. 3,729,984 describes an apparatus which is utilized in a high production rate for testing containers. In U.S. Pat. No. 3,729,983 a flushing-type gas is used in combination with a detector gas for purpose of leak detection.

In none of the foregoing prior art patents is there a high capacity machine illustrated which utilizes helium or another highly sensitive type gas for leak detection in an apparatus which can be utilized at a high production capacity. For example, U.S. Pat. Nos. 2,486,199; 3,342,990; 3,247,373; 3,265,890; 3,277,295 and 3,360,151 are all concerned with a basic leak detection system utilizing a spectrometer and helium gas. In U.S. Pat. Nos. 3,949,596 and 3,520,176 helium leak detection devices are described which would not lend themselves to leak detection on a mass production basis. While more rapid-rate-type testing units are described in U.S. Pat. Nos. 3,914,983 and 3,729,984, these units either are not adaptable to production rates of the type concerned with in this invention or do not utilize helium gas. The same is true concerning U.S. Pat. No. 3,729,983.

It is an advantage of the present invention to provide an apparatus and method for detecting leaks in containers at high production rates. Other advantages are an apparatus and method which is especially adapted to detecting leaks in semirigid containers composed of a plastic material; utilizes helium gas as a detection medium for maximum sensitivity; an apparatus which is modular in design and can be adapted to various production rates; an apparatus which utilizes open pocket members for fast placement and ejection of the containers for rapid testing procedure; an apparatus which can be readily adapted to various sized containers without extensive modification to the apparatus; and a machine which is highly sensitive to leak detection as an indication of the integrity of the container and its ability to maintain the contents in sterile condition.

SUMMARY OF THE INVENTION

The foregoing advantages are accomplished and the shortcomings of the prior art are overcome by the present apparatus and method which utilizes a carrier or turret member suitably supported in a rotatable manner on a frame and having a multiplicity of open pocket members arranged in a plurality of rows. Means are utilized to rotate the carrier member which is supported along a horizontal axis. The containers are releasably sealed against a sealing surface and helium gas is introduced into the containers. Detection means are carried by the frame member which includes a signal means to activate a release means to drop the containers from the pocket members at a predetermined time when it senses helium passing from inside the container. In a preferred manner, the apparatus is designed so that it rotates through twelve different positions for one cycle with approximately one-third of the cycle time utilized for introduction of the detection gas and approximately one-third of the cycle time utilized for purging the pocket members. The preferred gas is helium and the detection means employs a mass spectrometer. The method preferably utilizes a mass spectrometer of the stranded wire type, the intake conduit of which is positioned near the opened end of the opened pocket member into which the container is placed. An inert gas other than helium is passed over the outside of the container and in the direction of the intake conduit for the spectrometer so as to sweep the helium gas into the spectrometer intake. Further, and preferably, air is utilized to purge the pockets for subsequent utilization by additional containers and a combination of air and vacuum is utilized to flush the containers.

BRIEF DESCRIPTION OF THE DRAWINGS

A better understanding of the present leak detecting apparatus and method for determining leaks in a container will be afforded by reference to the drawings wherein.

DESCRIPTION OF THE PREFERRED EMBODIMENT

Figure 1:
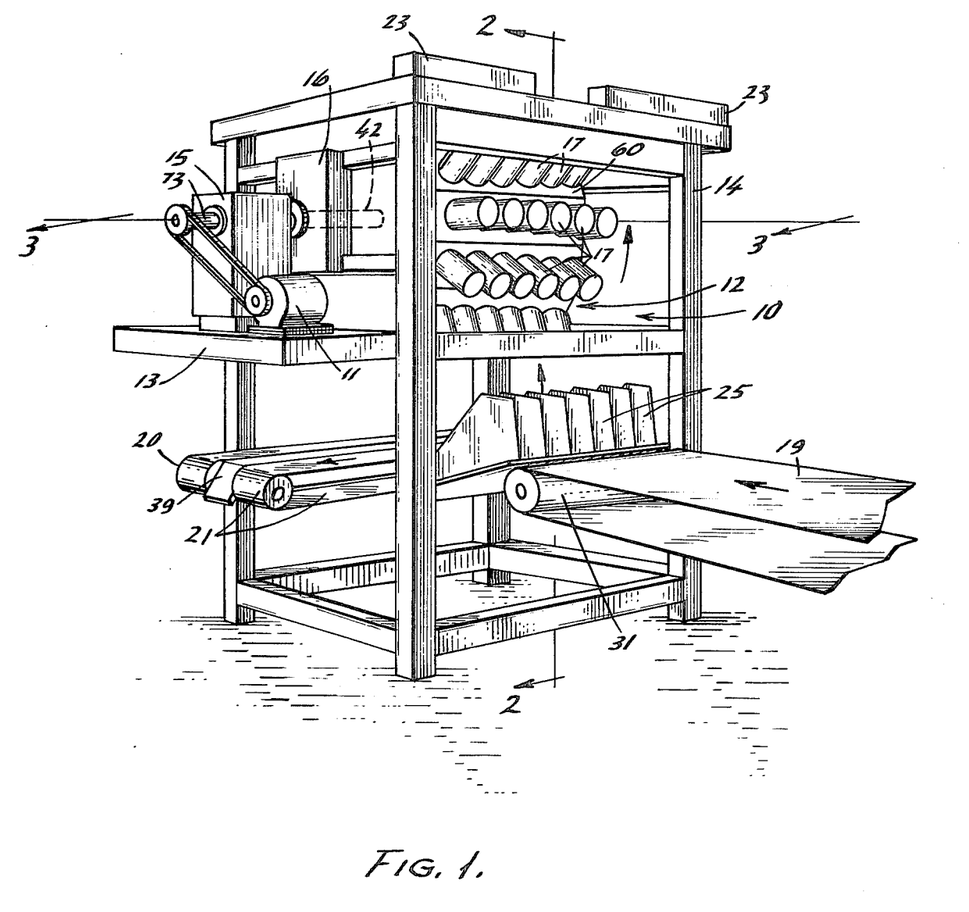
FIG. 1 is a perspective view of the leak detecting apparatus of this invention including various container conveyors for carrying containers to and from the apparatus.

Proceeding to a detailed description of the invention, and referring particularly to FIG. 1, the leak detector apparatus generally 10 is composed of a rotatable carrier or turret member generally 12 supported by a frame structure 14 along a horizontal axis. A drive means 11 drives an indexing device 15 both of which are mounted on a platform 13 which is supported on the main frame 14. The indexing device 15 engages drive shaft 42 which is journaled in frame bearing block 16 and to which is secured turret 12. A plurality of open ended tubular pocket members 17 are suitably disposed on turret 12 and are preferably arranged in rows of 6, depending upon desired production rate. An ingoing conveyor 19 and transverse outgoing conveyors 20 and 21 afford the means for moving containers to be tested into and out of leak detector 10. Guide plates 25 afford an alignment means for placement of the containers into the open pocket members 17. Suitably disposed at the top of leak detector 10 are mass spectrometers 23 which are utilized in detecting any leaking detecting gas, as will be later explained. The preferred leak detector apparatus 23 is described in U.S. Pat. No. 3,999,065 and is available from the Varian Vacuum Division, NRC Operation, Lexington, Massachusetts. Unlike many other mass spectrometers available, this unit is unique in utilizing a stranded wire probe for helium leak detection.

Figure 2:
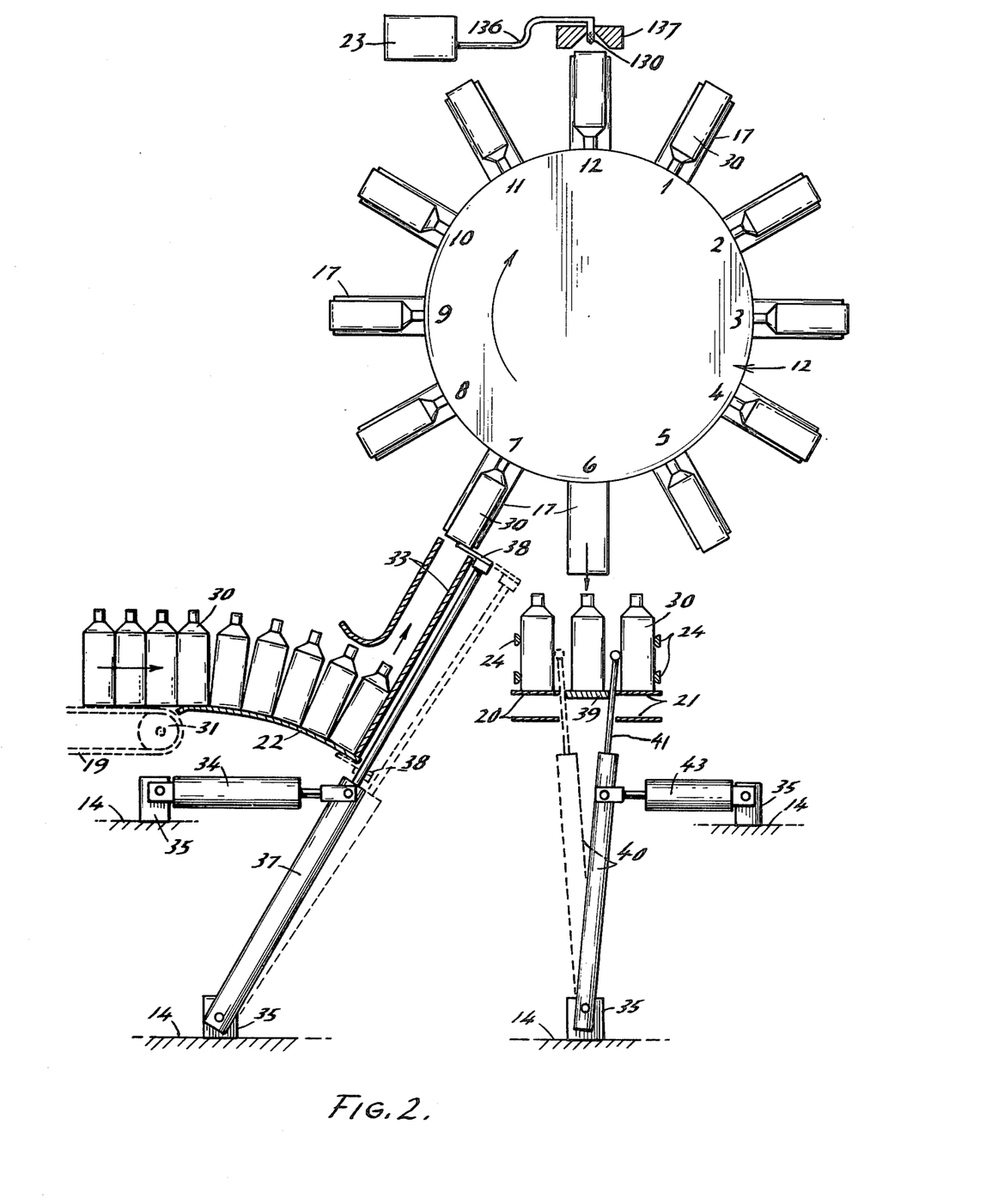
FIG. 2 is a schematic view in vertical section taken along line 2—2 of FIG. 1 and showing the loading of the containers into the rotating turret of the device in FIG. 1 as well as the unloading therefrom.

FIG. 2 represents, in a schematic manner, an infeed and outfeed mechanism means for the placement of bottles 30 into the open pocket members 17 of rotating turret 12. The bottles 30 in this instance have heavy rigid neck portions which flare out to form the body that has rather thin walls. For reference purposes, the bottle is described in U.S. Pat. No. Des.235,310 and is known in the trade as a semirigid container. The bottles will be moved in the direction of turret 12 by conveyor 19 which moves over conveyor drive roller 31. As the bottles leave conveyor 19 they are pushed forward by following bottles still on conveyor 19 onto a dead plate 22 which is shaped so the bottles on it will fan out as shown. A slide cylinder 37 which is pivoted by means of mounting block 35 and pivot cylinder 34 will cause lift fingers 38 to advance upwardly thus moving containers 30 from the end of deadplate 22 through appropriate guides 33 and 25 and into open pocket members 17. If desired, slide cylinder 37 can be replaced by a similar dual cylinder arrangement with each cylinder having a stroke equal to approximately ½ the stroke of cylinder 37, thus allowing a row of bottles to come to rest in the guides 33 where they could be held by added support means so the operator could visually inspect them and remove any obviously malformed ones, replacing them with "good" bottles. Turret 12 is suitably provided with twelve rows of the open pocket members and thus conveniently conforms to the positions of a clock as indicated by the numerals inside the turret. In a preferred manner, the seven o'clock position represents the infeed or intake station for the containers 30 and the 6 o'clock position will represent the unloading or discharge station. Disposed beneath the open pocket member 17 at the 6 o'clock position is a platform 39 which will receive the bottles. They can be alternately moved left or right from the platform 39 onto the split takeaway conveyors 20 and 21 equipped with guide rails 24 by means of oscillating member 40 having an arm 41 for engaging containers 30. Cylinder 43 is pivotally secured to member 40 to provide the required oscillation. Cylinders 34, 37, 43, and member 40 are preferably secured to frame 14 by means of pivotal mounting blocks 35.

Figure 3:
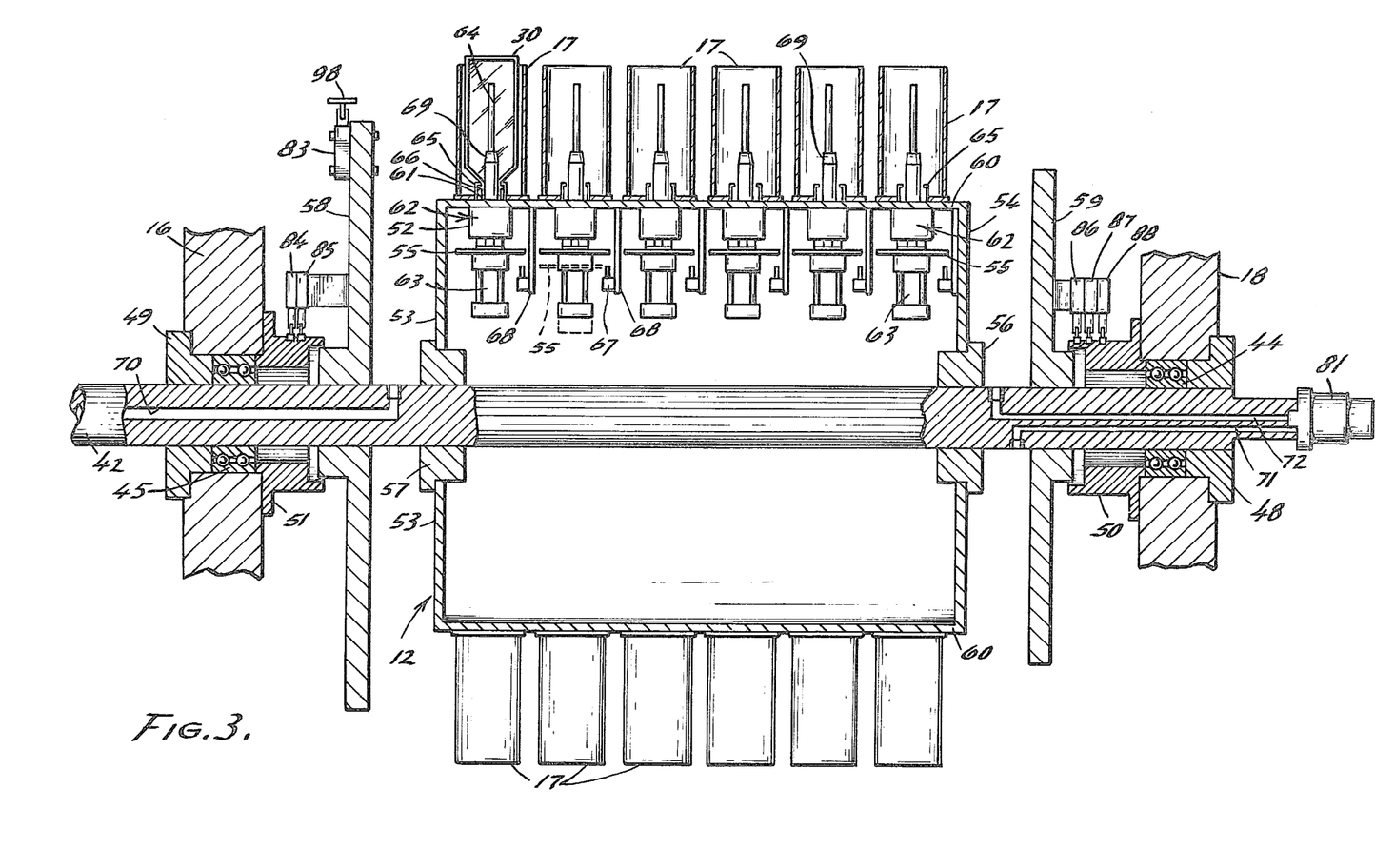
FIG. 3 is a view in vertical section taken generally along line 3—3 of FIG. 1.
Figure 7:
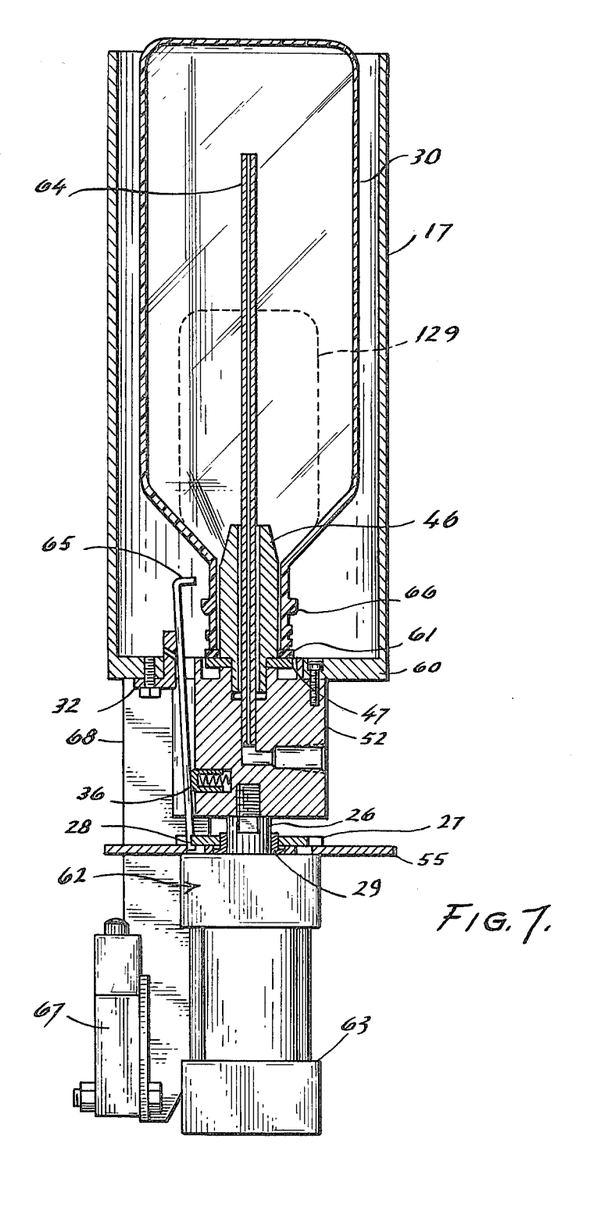
FIG. 7 is a view in vertical section of one of the container pocket and clamping members with a container shown therein in an unclamped position.

Referring to FIG. 3, it will be seen that drive shaft 42 is suitably mounted in frame bearing blocks 16 and 18 by means of bearings 45 and 44 which are positioned in the blocks by means of bushings 49 and 48 and bearing seating portions 51 and 50, respectively. Turret 12 is secured to shaft 42 by means of inner side plates 53 and 54 engaging collar members 57 and 56, respectively, which in turn are secured to shaft 42. Also secured to shaft 42 are outer plates 58 and 59 which hold a multiplicity of valves that will control the flow of air, vacuum, and test medium to the various tubular pockets 17 as will be described later. Clamping members 62 extend between inner side plates 53 and 54 at a position spaced from shaft 42 and from frame blocks 52. As shown in FIG. 7, the clamping members 62 include a pneumatic cylinder 63 which has its piston rod 26 anchored in frame block 52. Secured to cylinder 63 is a claw retention plate 55 and a claw pull plate 27 which are centered by ring 29. Gripping fingers 65 through notches 28 are pivotally attached to claw pull plate 27 at one end and engage annular flanges 66 on bottles 30 at the other end to hold the end of the neck of bottle 30 against a sealing surface 61. Movement of fingers 65 over flanges 66 is afforded through cam 32 secured to plate 60 and spring button 36. Projecting centrally from block 52 is an air nozzle member 64 which is designed to extend a substantial distance into bottle 30, for purposes as will be later explained. Annularly surrounding nozzle 64 is a second nozzle 46 for supplying helium and is sealed in block 52 by seal disc 47. Disposed in an opposite direction from nozzle 64 on horizontal support plate 60 is a vertical support plate 68 which carries a contact valve 67 for engagement with a transverse claw retention plate 55. It will be noted that shaft 42 contains several conduits for supplying the various utilities necessary to effect the leak detecting process such as an air conduit 70, an exhaust or vacuum conduit 71, and a helium conduit 72. Six sets of 12 valves each are suitably positioned on outer side plates 58 and 59 and are suitably interconnected with the conduits in shaft 42. For example, one set of 12 each of cam valves 83, 84 and 85 is secured on outer side plate 58, one set of 12 each of cam valves 86, 87 and 88 are positioned on outer side plate 59. One valve of each set of 12 valves is connected to one of the 12 rows of open pocket members on the turret. Each set of 12 valves is sequentially controlled at the proper point in the cycle by a cam fastened in a stationary manner to the main frame 14. The exact location of each of the 6 sets of 12 valves each is relatively unimportant as long as the various utilities are turned off and on to each of the 12 rows of open pocket members on the turret in a consistent known manner which will be described later. Otherwise, these 6 sets of 12 valves each can be located so the piping remains as simple as possible to install and maintain.

Referring to FIGS. 1 and 3 it can be seen that in operation the drive means 11 drives the input shaft 73 of the indexing device 15 which in turn intermittently drives shaft 42 and thus the turret 12 and outer side plates 58 and 59 with their associated sets of cam operated valves 83, 84, 85, 86, 87 and 88. The preferred indexing device is a commercially available cam actuated mechanism with a 90 degree index and a 270 degree dwell. Such devices are available from Ferguson Machine Co. of St. Louis, or Commercial Cam & Machine Co. of Chicago.

Each end of shaft 42 is equipped with a commercially available rotary air conduit connection 81 so air, helium and vacuum can be connected to the appropriate valves as explained later.

Figure 4:
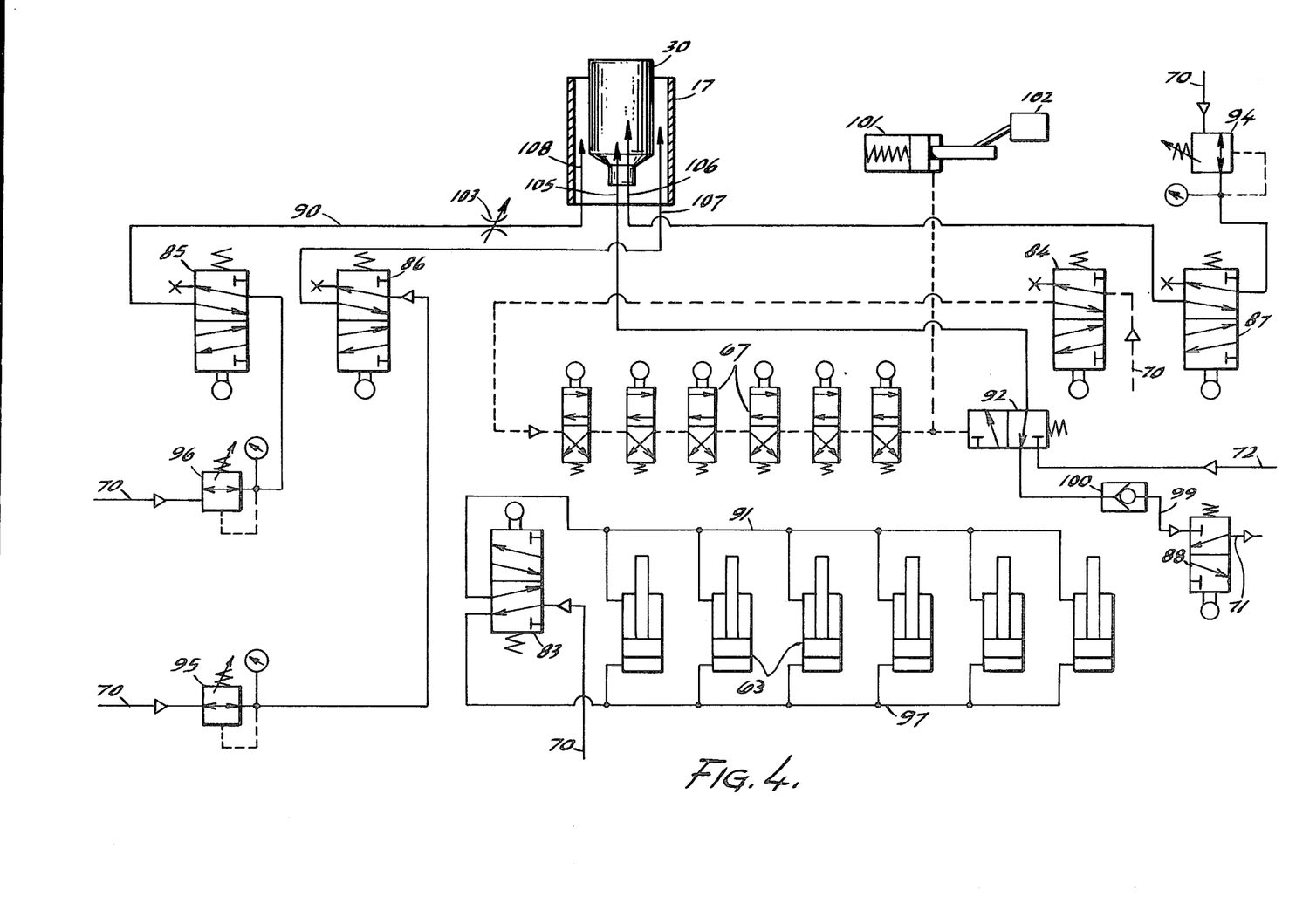
FIG. 4 is a diagramatic view showing the pneumatic system for clamping the containers in the turret pocket members as well as the fluid system for supplying detecting and flushing gas to the containers and pocket members.

FIG. 4 is the preferred piping schematic for this machine. This schematic shows the controls necessary for controlling the functions of one of the 12 rows of open pocket members on the turret. Thus, all controls shown on FIG. 4 must be multiplied by 12 in order to cover all members on the turret. Controls shown in FIG. 4 cover all of the controls mounted on the turret. Controls for operating the remainder of the air cylinders on the machine, such as cylinders 34 and 37 shown in FIG. 2 are controlled in conventional ways and are not shown since anyone skilled in the art can quickly see how they must be operated.

It will be seen that the clamping cylinders 63 are pneumatically operated through cam valve 83 which receives a source of air by means of conduit 70. Actuating lines 91 and 97 are interconnected to the clamping cylinders 63 in the usual manner.

Also illustrated in FIG. 4 is the flow means or conduit system for carrying helium from the source conduit 72 to the container 30. Helium flow conduit 72 is controlled by an air piloted valve 92. To control valve 92, air is fed from air conduit 70 through cam valve 84 at the proper point in the cycle, namely immediately after all container clamps in one row are activated. If all containers in one row are present and properly clamped all of the limit valves 67 will be actuated by their respective transverse contact plates 55. This allows pilot air to be fed to valve 92 causing it to shift and admit helium via conduit 105 and nozzle 46 to all containers in that row of the turret. In the event one or more containers in that row are missing, valve 92 will not shift and no helium is admitted to any of the containers in that row. In such an occurrence cylinder 101 actuates limit switch 102 which in turn triggers a commercially available ball-type memory device 125, shown in FIG. 5, so all containers in that row will be ejected from the machine at a later reject station as being untested. The electromechanical memory means 125 used in this instance is available from the Ebbert Engineering Co. in Troy, Michigan.

It should be obvious to anyone skilled in the art that the preceding system could be modified so in the event that one or more containers in a given row are missing or not clamped properly that helium would be not admitted to those stations only, but would be admitted to all other stations in that row. However, such a system would increase the complexity of the circuitry considerably. Since such occurrences should be extremely rare and such rejected containers can be easily retested, the added complexity was judged to be unjustified.

Although it was not found to be necessary in this particular application, it should also be obvious to anyone skilled in the art that the resulting helium-air mixture in the bottles could be made to have a greater concentration of helium if some of the air in the bottle is removed through air nozzle member 64 and conduit 106 as helium is initially introduced to the bottle. This could easily be done by installing another cam valve connected to conduit 106 so it is parallel to valve 87. This additional valve could be connected to the vacuum supply conduit 71 in shaft 42. Then by momentarily actuating this additional valve as helium is first fed into the bottles some of the air trapped in the bottles could be removed by vacuum and therefore more helium could be added to each bottle.

Figure 5:
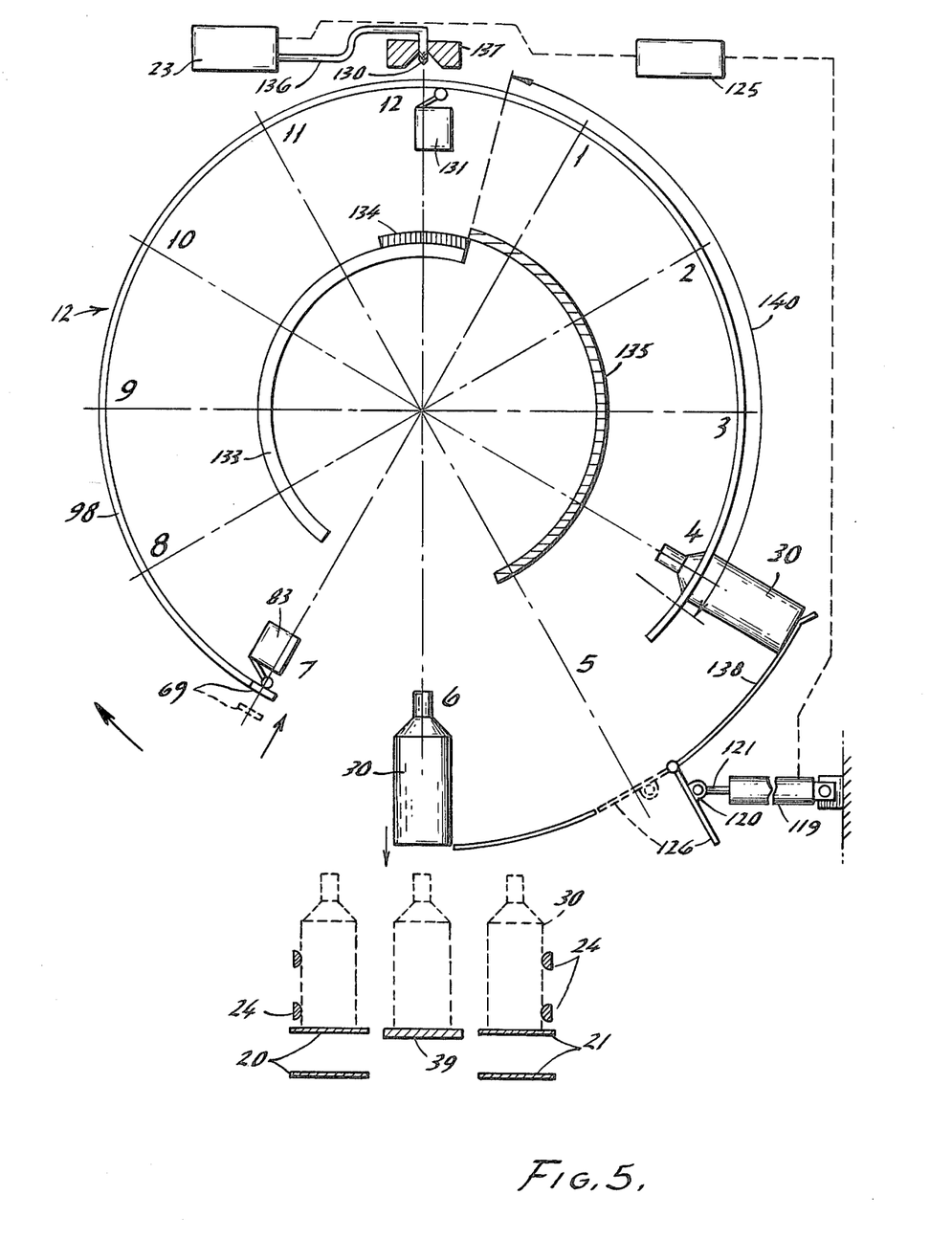
FIG. 5 is a schematic view illustrating the sequence for supplying the various gases and purging of the container and pocket member through one complete cycle of the apparatus shown in FIG. 1.

After the containers have been pressurized with the test medium, helium in this instance, sufficient time is allowed for the test medium to pass through any holes in the container being tested. After such a period of time, the container 30 under test will be brought under the test chamber 137 which is connected to a helium mass spectrometer 23. At that time relatively low pressure air in laminar flow is admitted to the closed end of the open ended tubular container pocket 17. Such air is taken from conduit 70, passed through a pressure regulator 96 and is controlled by cam valve 85 so it is turned on and off at the proper point in the cycle. Such air then flows through conduit 90 and through an adjustable flow rate valve 103. It is admitted to the annular space between the outside wall of the container 30 under test and the inside wall of the open ended tubular pocket 17 that surrounds the container. Such air then passes into a funnel shaped compartment 137 located over and immediately adjacent to pocket 17 when it is at the 12 o'clock position. This chamber has the aforementioned braided wire-type probe 130 located in the center of its small end as shown in FIG. 5. This probe is connected to a vacuum source in the mass spectrometer 23 preferably by means of a flexible conduit 136 so a small sample of the gas from the annular space between the container 30 and its surrounding open ended tubular pocket 17 will be drawn into the mass spectrometer for analysis. In the event the container has no leak, this sample passing to the mass spectrometer 23 will be only air and the system will accept the bottle as one that does not leak. However, if the container under test does leak, the test medium will collect in the annual space between the bottle and its surrounding pocket so the air admitted to this space via conduit 108 will sweep it into the sampling chamber 137. Thus, the sample of gas taken into the mass spectrometer 23 via probe 130 will contain an amount of test medium which will be proportional to the leak rate of the container under test.

To prevent the buildup of any test medium in the sampling chamber 137 which would result in possible false reject signals for containers tested immediately after a leaky container passed this point, it is important that this chamber be cleaned of any test medium immediately after use. This is done by tripping cam valve 131 (see FIG. 5) which momentarily applies vacuum to this chamber by means of a conventional solenoid valve, evacuating such gases to a point well away from the test area.

After the container 30 leaves the test area it passes under a hood (not shown) that is evacuated to a point well away from the test area. The low pressure laminar air flow controlled by cam valve 85 is turned off and high pressure purge air is taken from air conduit 70, passed through pressure regulator 95, and is admitted to the annular space between the container 30 and the open ended tubular pocket 17 via conduit 107 by cam valve 86.

As the container 30 leaves the test area cam operated valve 84 shifts the air piloted valve 92 so that the contents of the container 30 can be subjected to the vacuum in conduit 71 whenever cam valve 88 is activated. At the same time that vacuum is applied to container 30, cam valve 87 is actuated so air from conduit 70 will flow through pressure regulator 94 and enter the container 30. This combination air flow/vacuum evacuation assures that all test medium will be evacuated from the system preparatory to the introduction of another container for subsequent testing. Conduit 99 is equipped with check valve 100 to prevent any possible back flow of test medium which could give erroneous results.

After evacuation of all test medium from the system just prior to the reject station, the containers are unclamped by cam valve 83 reversing air to the clamp cylinders 63. For any container found to have a leak a reject mechanism is operated in order to remove such a container from the system. All accepted containers pass the reject station and are removed from the machine at a later point. These systems will be described in detail at a later point.

FIG. 5 illustrates a typical cycle of operation of a container from the time it enters into a pocket at station No. 7. It will be seen that at station 7, as the container enters a pocket such as 17, a short arcuate shoe 69 attached to pusher 38 contacts the roller on cam valve 83 which causes the container to be clamped as previously described. This shoe holds cam valve 83 until the turret indexes slightly so the roller on cam valve 83 rests on the circular holding cam 98. The pusher 38 then moves away, retracting for its next loading stroke. The arcuate portions shown by the numerals 133, 134 and 135 represent the different stages or stations at which the helium, air and vacuum are supplied to the container 30 or the pocket 17. For example, as container 30 leaves its position at 7 o'clock, helium will be supplied to inside the container. This is indicated by arcuate bar 133. Helium will continue to be supplied through conduit 105 and nozzle 46 until the turret, rotating in a clockwise manner, reaches a 12:30 position. At the same time, where arcuate bar 134 is shown, laminar air will be supplied through line 108. Arcuate bar 135 represents the time that high pressure air through cam valve 86 and conduit 107 and vacuum through cam valve 88 and conduit 105 is supplied for purposes of purging the bottles 30. Arcuate bar 135 also shows the cycle time that air is supplied to the bottles 30 via cam valve 87 and conduit 106.

At the 12 o'clock position there is stationed a sampling chamber 137 containing a braided wire vacuum probe 130 which will sample gas swept from the annular space between container 30 and pocket 17 by causing it to flow to mass spectrometer 23. If this sample contains helium in a concentration greater than specified, the mass spectrometer 23 transmits an electrical signal to an electromechanical memory means 125. This memory means 125 is of the ball-memory type as mentioned previously.

At station 4:30 the bottles are unclamped. The pressurizing air in the bottles 30 as supplied by cam valve 87 and conduit 106 will cause the bottles to come part way out of pocket 17 and to ride along restraining rails 138. If a signal has been received by the memory that a leaky bottle has been found, the memory system will cause the piston rod 121 of cylinder 119 to retract thus opening gate 126 by pulling on bracket 120 which is attached to it. Thus, the faulty bottle will be ejected at the 5 o'clock position. Air supplied to the bottle via cam valve 87 and conduit 106 or nozzle 64 will cause the faulty bottle to be ejected quickly and cleanly. After the faulty bottle is ejected gate 126 is again closed by cylinder 119.

The area between the 12:30 and 4:30 positions is covered with a hood as indicated by the double ended arrow 140. This hood will collect any extraneous helium that may escape during the bottle and pocket purging operation previously described and exhaust it to an area remote from the testing operation so it cannot generate false signals at the mass spectrometers.

Nonleaky containers which are accepted are discharged from machine 10 at station 6. They are discharged onto deadplate 39 while controlled by drop guide means 132 shown in FIG. 6 and described later, and then are swept onto one of the two takeaway conveyors 20 or 21 by sweep member 40 as shown in FIG. 2 and described earlier.

Figure 6:
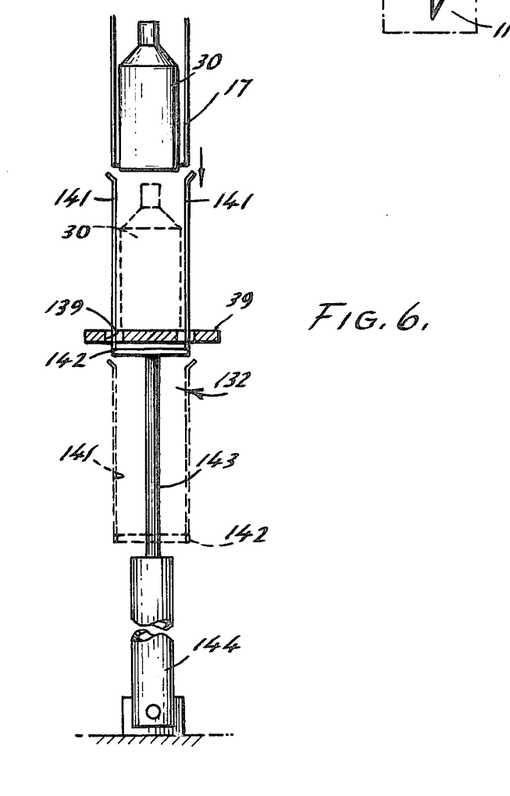
FIG. 6 is a view in side elevation illustrating the drop guiding menans for placing containers in an upright position on a support platform.

FIG. 6 illustrates a drop guiding means 132 for bottles 30. A set of guide fingers 141 are secured to piston plate 142 and slidably received through openings 139 in deadplate or platform 39. Air cylinder 144 retracts fingers 141 as shown in broken lines, by means of piston rod 143 so bottles 30 can be laterally moved as explained herein.

Figure 8:
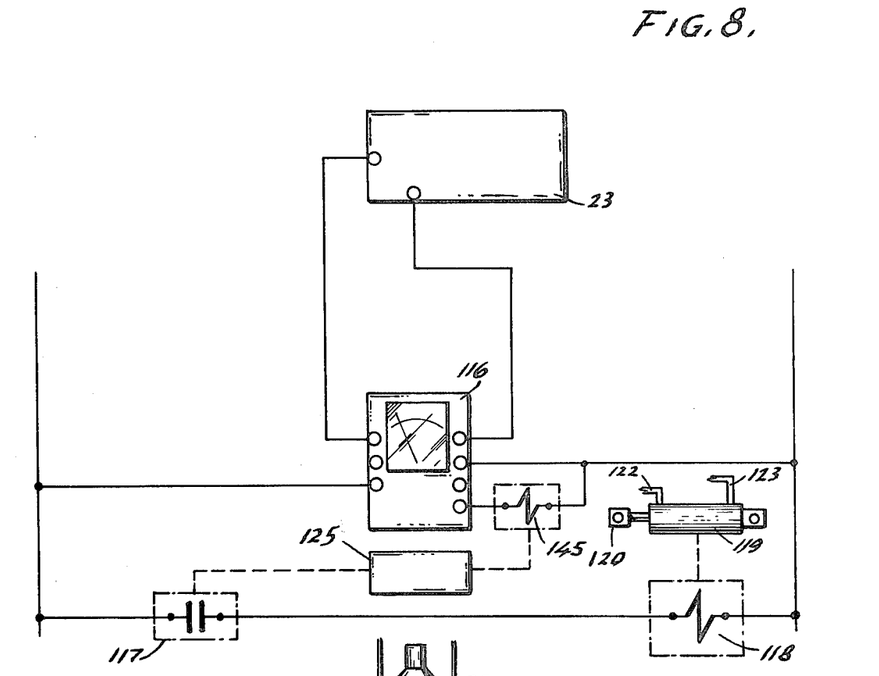
FIG. 8 is a schematic view illustrating a wiring diagram for the detection and container release means of the apparatus.

Referring to FIG. 8, it will be seen that the mass spectrometer 23 is interconnected with a leak rate meter 116 for purposes of adjusting the sensitivity of the mass spectrometer. The leak rate meter is ultimately connected to solenoid 145 which is located in memory means 125. When this solenoid is energized, the memory is engaged which, when the leaky bottle reaches position 5 as shown in FIG. 5, will close contacts 117 in the memory means thus energizing solenoid valve 118 which operates pneumatic cylinder 119 which is supplied by the usual fluid lines 122 and 123. This causes the appropriate reject gate 126 to open, then allowing the faulty container to be ejected as previously described.

Operation

A better understanding of the advantages of the leak detector 10 and the method of this invention will be had by a description of their operation. Bottles 30 will be carried by means of conveyor 19 onto deadplate 22 and into guide plates 25. They will then be moved from deadplate 22 by being lifted upwardly by lift cylinder 37 and lift fingers 38. The bottles are placed into pockets 17 at a position on rotatable turret 12 which would be that of the 7 o'clock position. This represents the infeed and clamping station. At this position, as the bottles are placed into the open pockets 17, clamp valves 83 will be actuated by a short arcuate shoe 69 on lift fingers 38 thus causing gripping fingers 65 to be moved downwardly over cam 32 as pneumatic cylinder 63 moves downwardly to position fingers 65 over annular flange 66 to tightly hold the end of bottle 30 against the resilient sealing surface 61. As the turret continues to rotate in a clockwise manner and just after leaving the 7 o'clock position, valve 92 will be activated so as to cause helium to flow into bottle 30 by means of orifice 46 and represented by inlet line 105. This represents the pressurizing station for the detecting gas. Helium will continue to be introduced into the container under suitable pressure through the 12 o'clock position and as indicated by the arcuate bar 133 in FIG. 5. At approximately the 11:30 position, cam valve 85 will be activated to cause a low velocity, laminar flow air to flow from line 108 over the outside of the container and in the direction of sampling chamber 137. The laminar flow air will continue through as much of the cycle as indicated by the arcuate bar 134. Any helium which may escape through the container wall will then be passed into the sampling chamber 137 and ultimately through probe 130 and into mass spectrometer 23. This represents the testing station. The mass spectrometer will then activate memory 125 and subsequently solenoid 118 to cause any faulty bottle to be rejected later at position 5. As the turret leaves position 12 limit switch 131 is activated which causes vacuum to be applied momentarily to test chamber 137 in order to clear any helium from this area.

As the turret approaches approximately the 12:30 position, the introduction of helium will cease and the introduction of purge air will begin through activation of cam valve 87 which will permit air to flow through air line 106 and into bottle 30 by means of nozzle 64. At the same time cam valves 88 will be activated to effect a vacuum in line 105 to pull helium from inside bottles 30. The purging of bottle 30 with air while evacuating with a reduction of pressure is represented by arcuate bar 135. At the same time that air is introduced into bottles 30, high velocity purge air will be introduced through cam valve 86 which will permit air flow through air purge line 107 to purge pockets 17 for the positions indicated by the arcuate bar 135. As a bottle reaches approximately the 4 o'clock position, the bottle will engage a guide surface 138. At this position, the bottles will be unclamped by activation of cam valve 83 with the bottles continuing to ride along guide surface 138. If a defective bottle has been detected at position 12 this will have activated memory means 125 which will activate solenoid 118 at the proper time which in turn will activate pneumatic cylinder 119 to open gate 126 and cause the faulty bottle to be ejected from the machine. This represents a rejecting station at position 5. Bottles which have not been detected as having leaks will continue to ride along guide surface 138 until the 6 o'clock position where they will be received by guide fingers 141 for guidance during dropping onto platform 39. After fingers 141 are retracted by cylinder 144, they will be moved from either side onto exit conveyors 20 and 21 by contact with arm 41 of reciprocating slide 40. This is the unloading station. The bottles will then be carried to the next station in a filling operation such as a washing station.

It should be further appreciated that in conjunction with the rotating turret 12 and particularly as shown in FIG. 5, that an exhaust hood arrangement would be employed to collect any helium which is purged from the pockets and for the space which is generally indicated by the double-headed arrow 140. This segment of the turret cycle is the major portion of the venting station for evacuating any helium gas to an area remote from the testing area.

Although not shown in the drawings, the various utilities such as the air, helium and vacuum will be interconnected to the various cam valves positioned on the outside of side plate 59 on turret 12 by suitable manifolding to the conduits in drive shaft 42.

Leak detector 10 by means of the multiplicity of rows of pocket members 17 can detect leaks in containers at the rate of 120 containers per minute. This rate is accomplished by using pocketed wheels with six wheels having twelve pockets per wheel. The unit is modular in design as it can be readily appreciated that any number of rows of wheels of pocket members could be added or diminished rather than using the preferred six wheels of twelve pockets each. The machine can accommodate various sizes of containers by mere modification of the size of the pocket members. This is somewhat indicated by the showing of bottle 129 in FIG. 7. Although not shown in FIG. 7, it is desirable to keep the annular space between the outside surface of the bottles 30 or 129 and the inner surface of pocket member 17 as small as possible. By doing this, any helium from a leaky bottle will cause a more concentrated helium level in this space thus making it easier to detect, thus increasing the sensitivity of the machine. Therefore, on machines which are to handle more than one size container it is preferable to provide different size pocket members 17 for each size container. Such pocket members should be easily interchangeable which can be done by anyone skilled in the art.

Also, under certain conditions, it may be found desirable to equip the lower end of sampling chamber 137 with a gasket and then provide a means of lowering and raising said sampling chamber. As the pocket members 17 are brought to the 12 o'clock position and stopped, sampling chamber 137 can then be lowered so the gasket in its lower end will seal against the open end of pocket member 17 thus providing a completely sealed chamber from which a gas sample is drawn into the mass spectrometer for analyzing. Such a system prevents the dilution of the gas sample by the surrounding atmosphere and thus makes for increased sensitivity. Further, the leak detector apparatus is capable of operation with containers which are difficult to handle at high production capacities in that they are in effect top heavy having a relatively thick neck section with relatively thin elongated walls.

When utilizing helium as a detecting gas, a highly sensitive unit and method is provided yet at the same time its sensitivity can be easily modulated. The leak detecting apparatus achieves its high capacity in utilizing helium gas in that it cannot only introduce helium and have the container analyzed in a short span of time by means of a directional laminar air flow but also has the means of purging both the container and the pocket member so that no residual helium is carried over to the next cycle when a new container is introduced.

Helium is the preferred leak detecting gas since its molecular size allows it to pass through the smallest holes, is inert and nonpolluting, and it is relatively plentiful and inexpensive. However, if desired, other gases capable of being used for leak detection could be used such as carbon dioxide, nitrogen or argon, with other detection systems than mass spectrometers. It is indicated that low velocity air is used to sweep the outside of bottles 30 and aid in moving helium toward the inlet of the mass spectrometer. This could be eliminated as could the flushing technique. However, a much lower capacity machine for leak direction would result.

Turret 12 with side plates 53 and 54 forms in effect a drum member with open pockets numbering 72. If desired, any number of pocket members could be utilized. Further, while approximately ⅓ of the turret sequence cycle time is utilized for the introduction of gas and ⅓ of the time for purging the pocket members, these times could be altered if desired. The same is true concerning the sequence time for purging the bottles.

The mass spectrometer 23 is positioned in relation to the open pocket members at their most upright position. This is the most advantageous position when using a gas lighter than air. Obviously, this position could be altered, especially if other types of gases were employed. FIG. 1 indicates two such mass spectrometers. It should be pointed out that in practice six mass spectrometers are employed; one for each row of pockets. In practice, it may be desirable in order to obtain utmost reliability to use two mass spectrometers for each row of pockets, with one unit in use and the other maintained in a stand-by condition. Then, if any troubles are encountered with the unit in use, the stand-by one can be switched into use by either manual or automatic means and the faulty unit removed for off-line repair when it is convenient.

In addition, while thin walled and heavy necked containers composed of plastic have been exemplified in the leak detecting apparatus 10 and the method, other containers such as those composed of cardboard, or cardboard coated plastic could be employed. They could also be formed in various shapes and sizes.

It will thus be seen that through the present invention there is now provided a detecting means and method for detecting leaks in containers which affords high capacity production rates yet is very sensitive in its operation. The leak detecting apparatus and method can detect leaks in various types of containers whether of the plastic heavy or thin wall variety and irrespective of their configuration and design. The apparatus is adaptable, of modular modification and is highly automated in that it can be operated under the supervision of a trained technician.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. An apparatus for testing leaks in a multiplicity of containers at a high rate utilizing a leak detecting gas comprising:
   a carrier member;
   a frame member to support said carrier member in a rotatable manner on a horizontal axis;
   means to rotate said carrier member;
   a multiplicity of open-ended pocket members carried by said carrier member and arranged in a plurality of rows;
   means to introduce said containers into said pocket members;
   means disposed opposite said open ends of said pocket members defining a sealing surface for closing said containers;
   means carried by said carrier member to releasably seal said containers against said sealing surface;
   means operatively associated with said means to seal said containers to introduce said leak detecting gas into said containers;
   detection means carried by said frame member; and
   signal means operatively associated with said detection means to activate said means to release said containers from said pocket members.

2. The apparatus for testing leaks in a multiplicity of containers as defined in claim 1 wherein said carrier member and said frame member define together an infeed and clamping station for said containers, a pressurizing station for said leak detecting gas, a testing station including said detection means, a venting station for flushing said detecting gas, a rejecting station for containers detected as having a leak and an unloading station for containers detected as having no leaks.

3. The apparatus for testing leaks in a multiplicity of containers as defined in claim 2 wherein said carrier member is defined by a turret member which is rotated through said stations in the order the stations are indicated and said stations comprise a complete cycle.

4. The apparatus for testing leaks in a multiplicity of containers as defined in claim 3 wherein approximately $\frac{1}{3}$ of the cycle time is utilized for introduction of said detecting gas and approximately $\frac{1}{3}$ of the cycle time is utilized for purging said pocket members.

5. The apparatus for testing leaks in a multiplicity of containers as defined in claim 4 wherein said test station is located at approximately the most upward portion of the turret cycle.

6. The apparatus for testing leaks in a multiplicity of containers as defined in claim 5 wherein said stations comprise 12 different positions as said carrier rotates through a complete cycle.

7. The apparatus for testing leaks in a multiplicity of containers as defined in claim 1 wherein said leak detecting gas is helium.

8. The apparatus for testing leaks in a multiplicity of containers as defined in claim 7 wherein said detection means is defined by a mass spectrometer.

9. The apparatus for testing leaks in a multiplicity of containers as defined in claim 8 wherein said mass spectrometer probe is of the stranded wire type.

10. The apparatus for testing leaks in a multiplicity of containers as defined in claim 8 wherein said means to introduce said leak detecting gas includes means to introduce air under pressure and effect a flow thereof between the outside of the containers and the pocket members and in the direction of said detection means.

11. The apparatus for testing leaks in a multiplicity of containers as defined in claim 10 wherein said detection means includes means to effect a reduction of pressure at the open end of said pocket members.

12. The apparatus for testing leaks in a multiplicity of containers as defined in claim 11 wherein said means to introduce said leak detecting gas includes means to introduce air under pressure to the inside of said container.

13. The apparatus for testing leaks in a multiplicity of containers as defined in claim 12 wherein said means to introduce said air under pressure in the inside of said container is defined by a nozzle member constructed and arranged to terminate a short distance from the closed end of said container.

14. The apparatus for testing leaks in a multiplicity of containers as defined in claim 1 wherein said means to releasably seal said containers against said sealing surface includes a pneumatically actuated clamping member.

15. An apparatus for testing leaks in a container utilizing a leak detecting gas comprising:
   an open-end pocket member;
   means defining a support member for said pocket member and enclosing one end of said pocket member;
   means to move said support member of a circuitous path;
   means to releasably seal said containers against a sealing surface;
   means to introduce said leak detecting gas into said containers;
   detection means operatively positioned with respect to the open end of said pocket member; and
   means to introduce a gaseous fluid other than said detecting gas under pressure and effect a flow thereof between the outside of the container and the pocket member in the direction of said detection means.

16. The apparatus for testing leaks as defined in claim 15 wherein said gaseous fluid is air and said detecting gas is helium.

17. The apparatus for testing leaks as defined in claim 16 wherein said detecting means is a mass spectrometer of the stranded wire type.

18. The apparatus for testing leaks as defined in claim 17 further including means to effect a reduction in pressure at the open end of said pocket member and to transfer any detecting gas to said spectrometer.

19. The apparatus for testing leaks as defined in claim 18 further including means to introduce a flushing gaseous fluid into said containers.

20. The apparatus for testing leaks as defined in claim 19 wherein said containers are composed of a plastic material.

21. A method of detecting leaks in plastic containers comprising:
placing said containers in an open-ended pocket member having at least one side wall;
introducing a leak detecting gas into said containers;
closing said containers to outside atmosphere against one end of said pocket member; and
positioning a spectrometer means adjacent the open end of said pocket member while said pocket member is maintained in an opened condition.

22. The method of detecting leaks as defined in claim 21 wherein said leak detecting gas is helium.

23. The method of detecting leaks as defined in claim 22 wherein said container is positioned with said open end of said pocket member in an upright position and said spectrometer is placed adjacent the opened end of said pocket member.

24. The method of detecting leaks as defined in claim 23 further including the step of flowing a fluid gas other than the helium over the outside of the container and in the direction of said spectrometer.

25. The method of detection leaks as defined in claim 24 wherein said fluid gas is air.

26. The method of detecting leaks as defined in claim 25 further including the steps of flushing and pocket member and said container with a flushing gas and evacuating said container.

27. The method of detecting leaks as defined in claim 21 wherein said containers are partially evacuated prior to the introduction of said leak detecting gas.

28. The method of detecting leaks as defined in claim 21 wherein said probe includes a probe and said probe is moved in a direction of said open end of said pocket member and sealed thereover.

29. The method of detecting leaks as defined in claim 28 wherein said spectrometer is of the stranded wire type.

* * * * *

UNITED STATES PATENT OFFICE
CERTIFICATE OF CORRECTION

PATENT NO. : 4,184,362
DATED : January 22, 1980
INVENTOR(S) : Wendell E. Standley and Edward M. Naureckas It is certified that error appears in the above-identified patent and that said Letters Patent are hereby corrected as shown below:

In column 12, line 43, Claim 15, after "member", delete "of" and substitute therefor -- over --.

In column 14, line 5, Claim 25, delete "detection" and substitute therefor -- detecting --.

In column 14, line 8, Claim 26, after "flushing", delete "and" and substitute therefor -- said --.

Signed and Sealed this

Twentieth Day of May 1980

[SEAL]

Attest:

SIDNEY A. DIAMOND

Attesting Officer       Commissioner of Patents and Trademarks